US011561801B2

(12) United States Patent
Yosef et al.

(10) Patent No.: US 11,561,801 B2
(45) Date of Patent: Jan. 24, 2023

(54) PREDICTING EXECUTION DURATION FOR USER-DEFINED FUNCTIONS ON FUNCTION-AS-A-SERVICE (FAAS) CLOUD COMPUTING PLATFORMS

(71) Applicant: Red Hat, Inc., Raleigh, NC (US)

(72) Inventors: Aviel Yosef, Raanana (IL); Boaz Shuster, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 293 days.

(21) Appl. No.: 16/857,530

(22) Filed: Apr. 24, 2020

(65) Prior Publication Data

US 2021/0334107 A1    Oct. 28, 2021

(51) Int. Cl.
*G06F 9/54*      (2006.01)
*G06F 9/445*     (2018.01)

(52) U.S. Cl.
CPC .............. *G06F 9/445* (2013.01); *G06F 9/542* (2013.01)

(58) Field of Classification Search
CPC .... G06F 9/4812; G06F 9/4843; G06F 9/5016; G06F 9/52; G06F 9/542; G06F 9/547; G06F 9/548
USPC .......................... 718/100, 104; 719/318, 330
See application file for complete search history.

(56) References Cited

U.S. PATENT DOCUMENTS 9,058,216 B2    6/2015 Frean et al.
9,531,604 B2   12/2016 Akolkar et al.
10,169,137 B2   1/2019 Cain et al.
10,552,774 B2   2/2020 Shih et al.
10,715,418 B1 * 7/2020 Cohen ................. H04L 67/1012
(Continued)

FOREIGN PATENT DOCUMENTS

CN          102207889 B     10/2013

OTHER PUBLICATIONS

Chapin, John, "The Occasional Chaos of AWS Lambda Runtime Performance", https://blog.symphonia.io/posts/2017-02-24_occasional-chaos-of-aws-lambda-runtime-performance, Feb. 24, 2017, 4 pages.
(Continued)

*Primary Examiner* — Andy Ho
(74) *Attorney, Agent, or Firm* — Dority & Manning, P.A.

(57) ABSTRACT

Predicting execution duration for user-defined functions on function-as-a-service (FaaS) cloud computing platforms is disclosed herein. In one example, a processor device of an FaaS cloud computing platform detects an event that triggers execution of a user-defined function, and automatically fetches an environmental metric that represents a current attribute or condition of the operating environment in which the user-defined function will execute. The processor device then calculates a predicted execution duration for the user-defined function based on the environmental metric, and compares the predicted execution duration to an execution duration threshold. If the predicted execution duration exceeds the execution duration threshold, the processor device prevents execution of the user-defined function by the FaaS cloud computing platform. If the predicted execution duration does not exceed the execution duration threshold, the processor device may initiate execution of the user-defined function. In this manner, the FaaS cloud computing platform's computing resources may be conserved.

20 Claims, 7 Drawing Sheets

(56) References Cited

U.S. PATENT DOCUMENTS

| | | | |
|---|---|---|---|
| 10,725,826 B1* | 7/2020 | Sagar | G06F 9/45558 |
| 10,983,768 B2* | 4/2021 | Madisetti | G06F 16/2379 |
| 2019/0319839 A1* | 10/2019 | Nozhchev | H04L 41/14 |
| 2021/0089363 A1* | 3/2021 | Bergsma | G06F 9/5044 |

OTHER PUBLICATIONS

Sosnowski, Damian, "Anatomy of AWS Lambda", https://dev.to/sosnowski/anatomy-of-aws-lambda-1i1e, Oct. 2, 2019, 28 pages.

* cited by examiner

PREDICTING EXECUTION DURATION FOR USER-DEFINED FUNCTIONS ON FUNCTION-AS-A-SERVICE (FAAS) CLOUD COMPUTING PLATFORMS

BACKGROUND

Cloud computing platforms are systems that provide automated, on-demand, self-service computing resources to customers via an application programming interface (API) over a network using a shared pool of configurable computing devices. A function-as-a-service (FaaS) cloud computing platform is a subset of cloud computing platforms that enables customers to define, execute, and manage user-defined functions using on-demand computing resources. While an FaaS cloud computing platform may shield customers from the need to build and maintain the underlying computing infrastructure, the complexity and usefulness of user-defined functions executed by the FaaS cloud computing platform may be limited by execution duration limitations imposed by the FaaS cloud computing platform.

SUMMARY

The examples disclosed herein relate to predicting execution duration for user-defined functions on function-as-a-service (FaaS) cloud computing platforms. In one example, an FaaS cloud computing platform, such as Amazon Web Services (AWS) Lambda, Google Cloud Functions, IBM Cloud Functions, or Microsoft Azure, provides a computing device comprising a processor device. Upon detecting an event that triggers execution of a user-defined function, the processor device automatically fetches an environmental metric that represents a current attribute or condition of the operating environment in which the user-defined function will execute. In some examples, the environmental metric may be fetched from a monitoring service within or external to the FaaS cloud computing platform. As non-limiting examples, the environmental metric may comprise a currently available network bandwidth, a current network latency, a current availability of a data source for the user-defined function, a current processor load level for the FaaS cloud computing platform, or a currently available memory level for the FaaS cloud computing platform.

The processor device then calculates a predicted execution duration for the user-defined function based on the environmental metric, and compares the predicted execution duration to an execution duration threshold (e.g., a timeout interval specified by the FaaS cloud computing platform). If the predicted execution duration exceeds the execution duration threshold, the processor device prevents execution of the user-defined function by the FaaS cloud computing platform. However, if the predicted execution duration does not exceed the execution duration threshold, the processor device initiates execution of the user-defined function. In this manner, the FaaS cloud computing platform may avoid execution of a user-defined function that is predicted not to complete execution before expiration of the timeout interval, which conserves computing resources by the FaaS cloud computing platform and allows the customer to avoid incurring charges for computing resources.

In another example, a method is provided. The method comprises detecting, by a processor device of a function-as-a-service (FaaS) cloud computing platform, a first event triggering execution of a user-defined function. The method further comprises automatically fetching, by the processor device, a first environmental metric. The method also comprises calculating, based on the first environmental metric, a first predicted execution duration for the user-defined function. The method additionally comprises determining that the first predicted execution duration for the user-defined function exceeds an execution duration threshold. The method further comprises, responsive to determining that the first predicted execution duration for the user-defined function exceeds the execution duration threshold, preventing execution of the user-defined function by the FaaS cloud computing platform.

In another example, a computing device of an FaaS cloud computing platform is provided. The computing device comprises a memory and a processor device coupled to the memory. The processor device is to detect a first event triggering execution of a user-defined function. The processor device is further to automatically fetch a first environmental metric. The processor device is also to calculate, based on the first environmental metric, a first predicted execution duration for the user-defined function. The processor device is additionally to determine that the first predicted execution duration for the user-defined function exceeds an execution duration threshold. The processor device is further to, responsive to determining that the first predicted execution duration for the user-defined function exceeds the execution duration threshold, prevent execution of the user-defined function by the FaaS cloud computing platform.

In another example, a computer program product is provided. The computer program product is stored on a non-transitory computer-readable storage medium, and includes computer-executable instructions to cause a processor device of an FaaS cloud computing platform to detect an event triggering execution of a user-defined function. The computer-executable instructions further cause the processor device to automatically fetch an environmental metric. The computer-executable instructions also cause the processor device to calculate, based on the environmental metric, a predicted execution duration for the user-defined function. The computer-executable instructions additionally cause the processor device to determine that the predicted execution duration for the user-defined function exceeds an execution duration threshold. The computer-executable instructions further cause the processor device to, responsive to determining that the predicted execution duration for the user-defined function exceeds the execution duration threshold, prevent execution of the user-defined function by the FaaS cloud computing platform.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
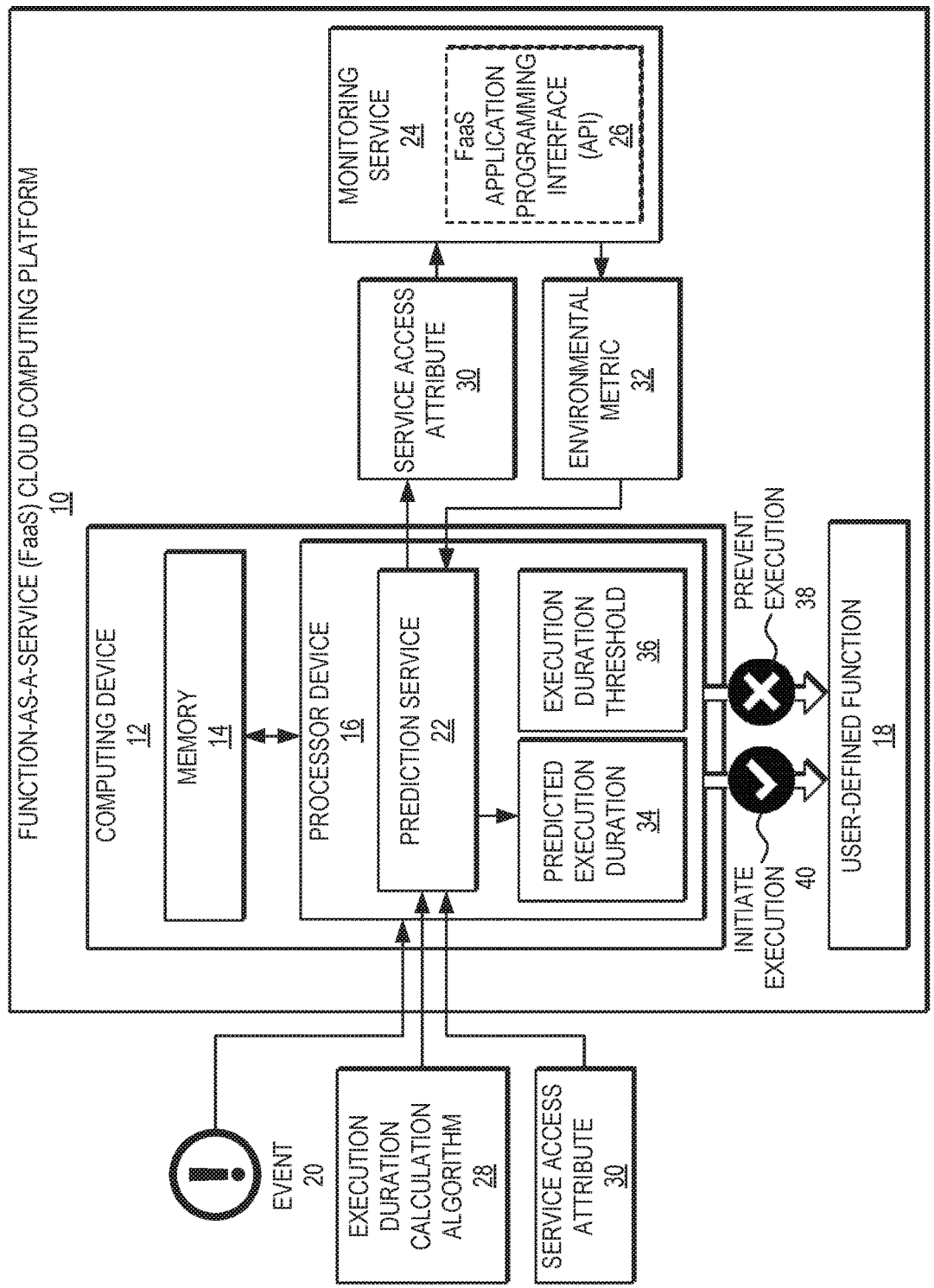
FIG. 1 is a block diagram of a function-as-a-service (FaaS) cloud computing platform in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As used herein, a "cloud computing platform" refers to a computing infrastructure that provides a shared pool of configurable computing devices enabling automated on-demand self-service to customers via an application programming interface (API) over a network. A cloud computing platform may be accessible via a public network such as the internet, or may be hosted on and only accessible within a private network. A "function-as-a-service (FaaS) cloud computing platform" is a specific type of cloud computing platforms that enables customers to define, execute, and manage user-defined functions (i.e., computer-executable instructions written by the customer) that execute using on-demand computing resources in response to an occurrence of a specified event. FaaS cloud computing platforms may include, as non-limiting examples, Amazon Web Services (AWS) Lambda, Google Cloud Functions, IBM Cloud Functions, and Microsoft Azure.

FaaS cloud computing platforms offer a number of advantages over other computing models. In particular, an FaaS cloud computing platform handles allocation of shared computing resources on behalf of the customer, and provides mechanisms for the customer to execute user-defined functions in response to events without having to build or maintain the underlying computing infrastructure. However, the complexity and usefulness of the user-defined functions executed by the FaaS cloud computing platform may be limited by execution duration limitations imposed by the FaaS cloud computing platform. For instance, an FaaS cloud computing platform may impose a fixed timeout interval on a customer's user-defined function. If an execution duration of the user-defined function exceeds the fixed timeout interval (due to, e.g., delays incurred while retrieving data from a third party source), the user-defined function may be terminated before it completes executing, or the customer may be subject to additional charges.

Accordingly, examples disclosed herein relate to predicting execution duration for user-defined functions on FaaS cloud computing platforms. In one example, an FaaS cloud computing platform provides a computing device comprising a processor device. When the processor device detects an event that triggers execution of a user-defined function, the processor device automatically fetches an environmental metric that represents a current attribute or condition of the operating environment in which the user-defined function will execute. In some examples, the environmental metric may be fetched from a monitoring service comprising an application programming interface (API) provided by the FaaS cloud computing platform, while some examples may provide that the environmental metric is fetched from a monitoring service external to the FaaS cloud computing platform. As non-limiting examples, the environmental metric may comprise a currently available network bandwidth, a current network latency, a current availability of a data source for the user-defined function, a current processor load level for the FaaS cloud computing platform, or a currently available memory level for the FaaS cloud computing platform.

The processor device calculates a predicted execution duration for the user-defined function based on the environmental metric. According to some examples, the predicted execution duration may be calculated using an execution duration calculation algorithm received by the processor device (e.g., from the customer or user of the user-defined function). The processor device then compares the predicted execution duration to an execution duration threshold (e.g., a timeout interval specified by the FaaS cloud computing platform). If the predicted execution duration exceeds the execution duration threshold, the processor device prevents execution of the user-defined function by the FaaS cloud computing platform. However, if the predicted execution duration does not exceed the execution duration threshold, the processor device initiates execution of the user-defined function by the FaaS cloud computing platform.

In some examples, the processor device receives (e.g., from the customer or user of the user-defined function) a service access attribute that corresponds to a monitoring service providing the environmental metric, and that represents parameter data used by the processor device to access the monitoring service. As non-limiting examples, the service access attribute may comprise a Uniform Resource Locator (URL) of the monitoring service, authentication information such as a user identifier and/or a password for gaining secure access to the monitoring service, and/or an access parameter such as a metric identifier that identifies the metric to be fetched from the monitoring service.

To illustrate an FaaS cloud computing platform in which examples may be practiced, FIG. 1 is provided. In FIG. 1, an FaaS cloud computing platform 10 provides a computing device 12 that includes a memory 14 and a processor device 16. The FaaS cloud computing platform 10 enables a user (not shown) to define, execute, and manage a user-defined function 18 that is automatically executed by the FaaS cloud computing platform 10 in response to an occurrence of an event 20. The user-defined function 18 comprises computer-executable instructions that are executed by, e.g., the processor device 16 or another processor device (not shown) of the FaaS cloud computing platform 10. In some examples, the event 20 may comprise any condition, whether occurring internally within the FaaS cloud computing platform 10 or external to the FaaS cloud computing platform 10, that is detectable by an element of the FaaS cloud computing platform.

The computing device 12 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing device 12 may include more or fewer elements than illustrated in FIG. 1. For example, the processor device 16 may further include one or more functional units, instruction caches, unified caches, memory controllers, interconnect buses, and/or additional memory devices, caches, and/or controller circuits, which are omitted from FIG. 1 for the sake of clarity. It is to be further understood that, while FIG. 1 illustrates only one computing device 12, in some examples the FaaS cloud computing platform comprises more computing devices and/or other constituent element than shown in FIG. 1.

As seen in FIG. 1, the processor device 16 executes a prediction service 22 that is responsible for performing operations for predicting an execution duration for the user-defined function 18. In some examples, the prediction service 22 may represent functionality that is provided by and integral to the FaaS cloud computing platform 10. Alternatively, some examples may provide that the prediction service 22 is a user-defined function, similar to the user-defined function 18, that initiates or prevents execution of the user-defined function 18. To predict an execution duration for the user-defined function 18, the prediction service 22 uses data fetched from a monitoring service 24. The monitoring service 24 may comprise any data source that is accessible to the prediction service 22, and that is capable of automatically providing information about a current attribute or condition of the operating environment in which the user-defined function 18 will execute. In the example of FIG. 1, the monitoring service 24 is shown as a part of the FaaS cloud computing platform 10, and thus the monitoring service 24 may comprise an FaaS API 26 using which the prediction service 22 may access data regarding the FaaS cloud computing platform 10. However, it is to be understood that, in some examples, the monitoring service 24 may be external to the FaaS cloud computing platform 10, and may provide data regarding operating conditions outside the FaaS cloud computing platform 10.

In exemplary operation, the prediction service 22 first receives an execution duration calculation algorithm 28 that represents a custom algorithm specified by the user for predicting the execution duration for the user-defined function 18. The prediction service 22 in this example also receives a service access attribute 30 that corresponds to the monitoring service 24, and that represents parameter data that is used by the prediction service 22 to access the monitoring service 24. Exemplary contents of the service access attribute 30 are discussed in greater detail below with respect to FIG. 2.

When the processor device 16 detects the event 20 triggering execution of the user-defined function 18, the prediction service 22 accesses the monitoring service 24 by providing the service access attribute 30 to the monitoring service 24. The prediction service 22 then fetches an environmental metric 32 from the monitoring service 24, where the environmental metric 32 represents a current attribute or condition of the operating environment in which the user-defined function 18 will execute. Examples of the environmental metric 32 are discussed in greater detail below with respect to FIG. 2.

After fetching the environmental metric 32 from the monitoring service 24, the prediction service 22 calculates a predicted execution duration 34 (i.e., a length of time that execution of the user-defined function 18 is expected to take in the current operating environment) using the environmental metric 32. In the example of FIG. 1, the prediction service 22 calculates the predicted execution duration 34 by executing the execution duration calculation algorithm 28 using the environmental metric 32 as an input. The prediction service 22 then compares the predicted execution duration 34 with an execution duration threshold 36. In some examples, the execution duration threshold 36 may comprise a timeout interval specified by the FaaS cloud computing platform 10 for execution of the user-defined function 18.

If the prediction service 22 determines that the predicted execution duration 34 exceeds the execution duration threshold 36, the prediction service 22 prevents execution of the user-defined function 18 by the FaaS cloud computing platform 10, as indicated by element 38. However, if the prediction service 22 determines that the predicted execution duration 34 does not exceed the execution duration threshold 36, the prediction service 22 initiates execution of the user-defined function 18 by the FaaS cloud computing platform 10, as indicated by element 40.

It is to be understood that, while FIG. 1 shows only a single service access attribute 30, in some examples the prediction service 22 may receive multiple service access attributes 30, and may provide the multiple service access attributes 30 to the monitoring service 24. Similarly, while FIG. 1 shows the prediction service 22 fetching only a single environmental metric 32 from the monitoring service 24, some examples may provide that the prediction service 22 may fetch multiple environmental metrics 32 from the monitoring service 24, or may fetch environmental metrics 32 from multiple monitoring services 24.

Figure 2:
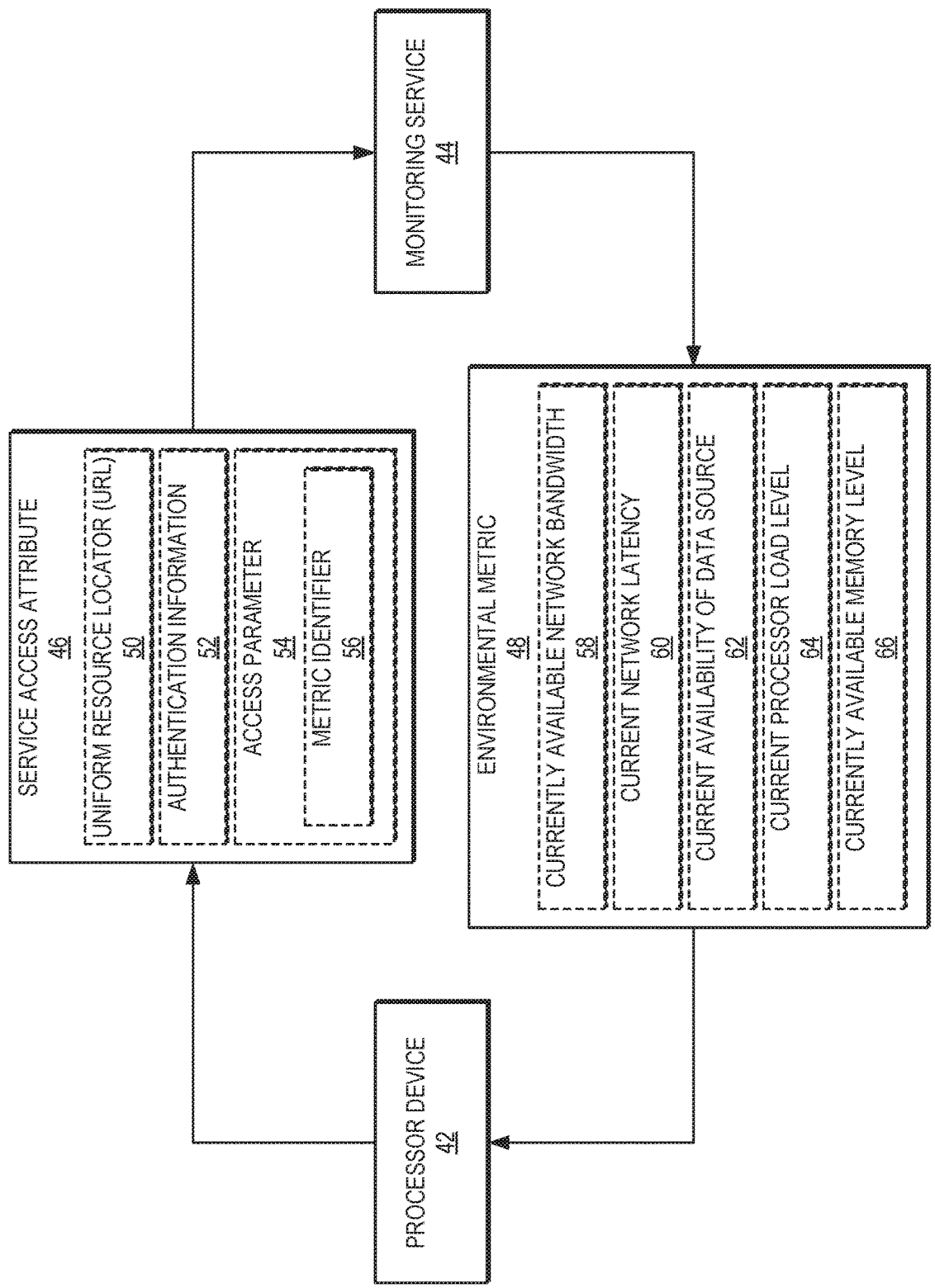
FIG. 2 is a block diagram illustrating exemplary service access attributes and exemplary environmental metrics corresponding to the service access attribute and the environmental metric, respectively, of FIG. 1, according to one example.

To illustrate exemplary service access attributes and exemplary environmental metrics corresponding to the service access attribute 30 and the environmental metric 32, respectively, of FIG. 1 according to one example, FIG. 2 is provided. FIG. 2 shows a processor device 42 and a monitoring service 44 that correspond in functionality to the processor device 16 and the monitoring service 24, respectively, of FIG. 1. The processor device 42 transmits a service access attribute 46 (corresponding to the service access attribute 30 of FIG. 1) to the monitoring service 44, and fetches an environmental metric 48 (corresponding to the environmental metric 32 of FIG. 1) from the monitoring service 44.

As seen in FIG. 2, the service access attribute may comprise a URL 50 of the monitoring service 44, which the processor device 42 may use to access the functionality of the monitoring service 44. The service access attribute also may comprise authentication information 52 that may be provided to the monitoring service 44 to allow secure access to data provided by the monitoring service 44. As non-limiting examples, the authentication information 52 may comprise a user identifier or username and/or a password or passcode. The service access attribute 46 further may comprise an access parameter 54 representing data to be used by the monitoring service 44 in providing the environmental metric 48 to the processor device 42. As a non-limiting example, the access parameter 54 may comprise a metric identifier 56 that identifies the environmental metric 48 to be fetched.

The environmental metric 48 that is fetched from the monitoring service 44 by the processor device 42 may comprise data relating to or describing a current attribute or condition of the operating environment in which a user-defined function, such as the user-defined function 18 of FIG. 1, will be executed. The environmental metric 48 thus may comprise a currently available network bandwidth 58 or a current network latency 60, or may comprise a current availability of a data source 62 indicating whether a data source to be accessed by the user-defined function 18 is accessible. The environmental metric 48 also may comprise information about a state of an FaaS cloud computing platform, such as the FaaS cloud computing platform 10 in FIG. 1, that will execute the user-defined function 18. Accordingly, the environmental metric 48 may comprise a current processor load level 64 or a currently available memory level 66 of the FaaS cloud computing platform 10.

Figure 3A:
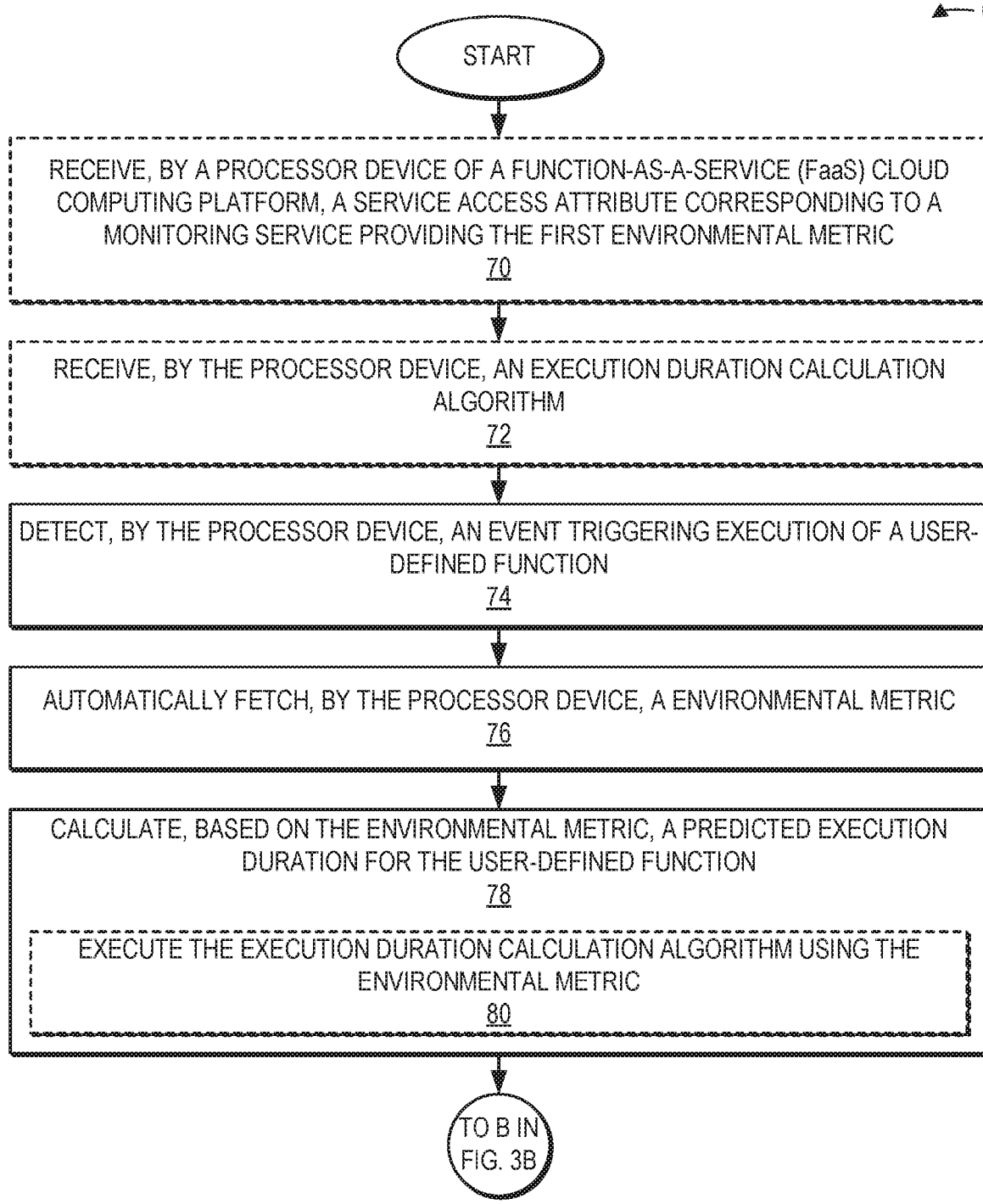
FIGS. 3A and 3B are flowcharts illustrating exemplary operations for predicting execution duration for user-defined functions on FaaS cloud computing platforms, according to one example.
Figure 3B:
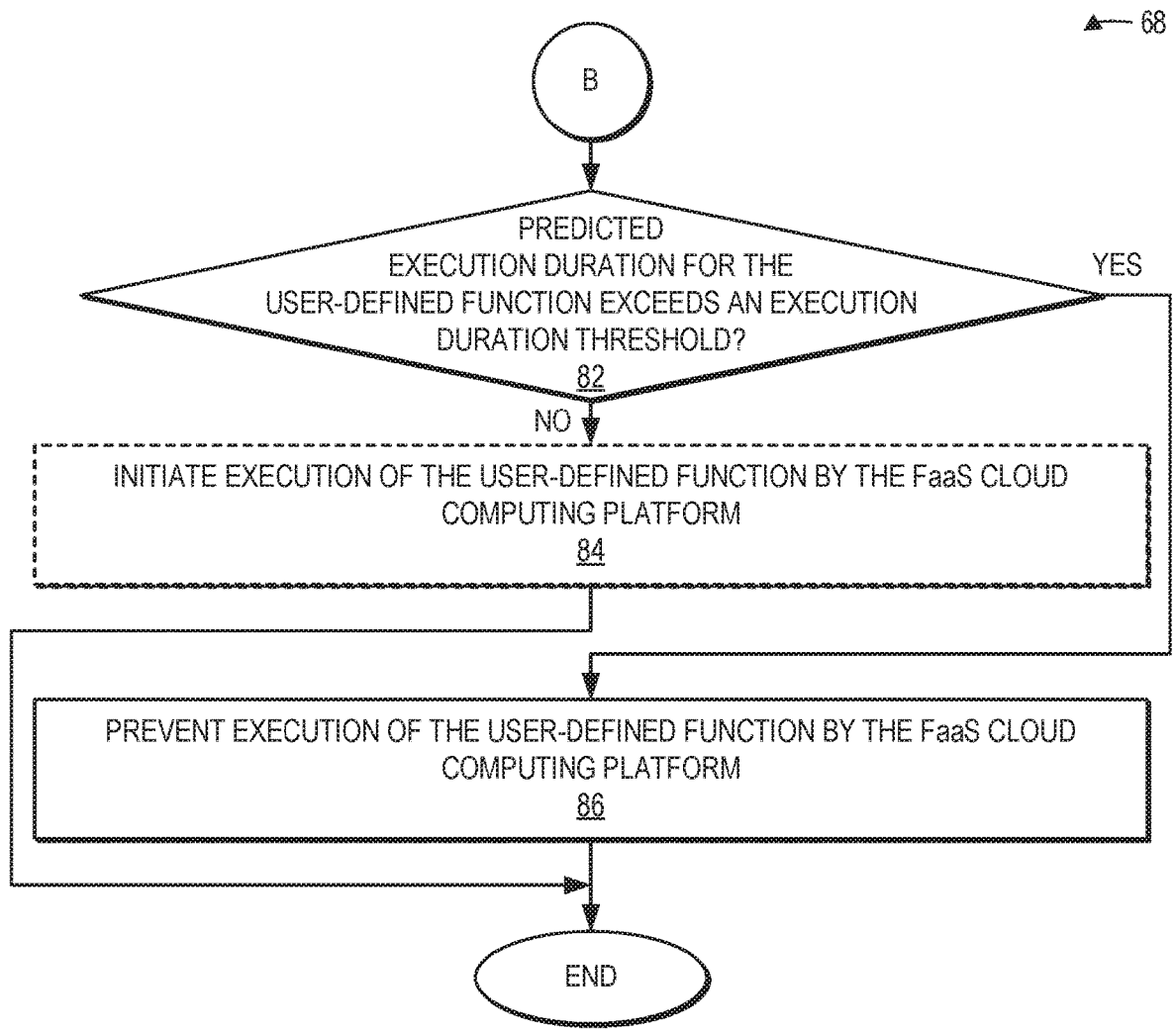

FIGS. 3A and 3B provide a flowchart 68 to illustrate exemplary operations for predicting execution duration for user-defined functions on FaaS cloud computing platforms, according to one example. For the sake of clarity, elements of FIGS. 1 and 2 are referenced in describing FIGS. 3A and 3B. Operations in FIG. 3A according to some examples begin with the processor device 16 of the FaaS cloud computing platform 10 of FIG. 1 receiving the service access attribute 30 corresponding to the monitoring service 24 providing the environmental metric 32 (block 70). The processor device 16 may also receive the execution duration calculation algorithm 28 (block 72).

The processor device 16 of the FaaS cloud computing platform 10 detects the event 20 triggering execution of the user-defined function 18 (block 74). In response, the processor device 16 automatically fetches the environmental metric 32 (block 76). The processor device 16 then calculates, based on the environmental metric 32, the predicted execution duration 34 for the user-defined function 18 (block 78). In some examples, the operations of block 78 for calculating the predicted execution duration 34 may comprise executing the execution duration calculation algorithm 28 using the environmental metric 32 (block 80). Operations then continue at block 82 of FIG. 3B.

Turning now to FIG. 3B, the processor device 16 determines whether the predicted execution duration 34 for the user-defined function 18 exceeds the execution duration threshold 36 (block 82). If not, the processor device 16 initiates execution of the user-defined function 18 by the FaaS cloud computing platform 10 (block 84). However, if the processor device 16 determines at decision block 82 that the predicted execution duration 34 does exceed the execution duration threshold 36, the processor device 16 prevents execution of the user-defined function 18 by the FaaS cloud computing platform 10 (block 86).

Figure 4:
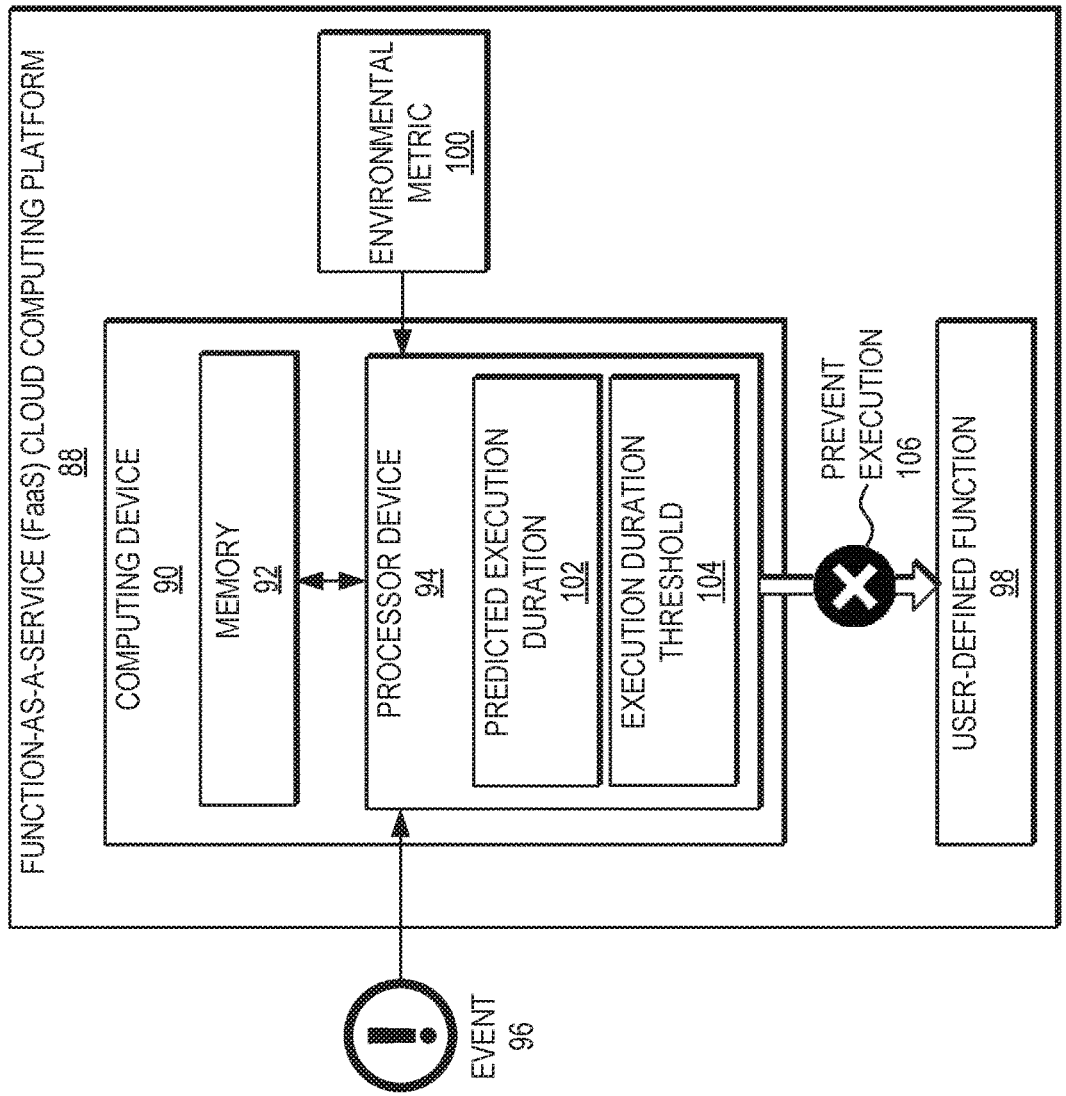
FIG. 4 is a simpler block diagram of the FaaS cloud computing platform of FIG. 1 for predicting execution duration for user-defined functions, according to one example.

To illustrate a simpler block diagram of the FaaS cloud computing platform 10 of FIG. 1 for predicting execution duration for user-defined functions according to one example, FIG. 4 is provided. In FIG. 4, an FaaS cloud computing platform 88 provides a computing device 90 that includes a memory 92 and a processor device 94. In exemplary operation, the processor device 94 detects an event 96 triggering execution of a user-defined function 98, and fetches an environmental metric 100 representing a current attribute or condition of the operating environment in which the user-defined function 98 will execute.

The processor device 94 calculates a predicted execution duration 102 using the environmental metric 100. The processor device 94 then compares the predicted execution duration 102 with an execution duration threshold 104. If the processor device 94 determines that the predicted execution duration 102 exceeds the execution duration threshold 104, the processor device 94 prevents execution of the user-defined function 98 by the FaaS cloud computing platform 88, as indicated by element 106.

Figure 5:
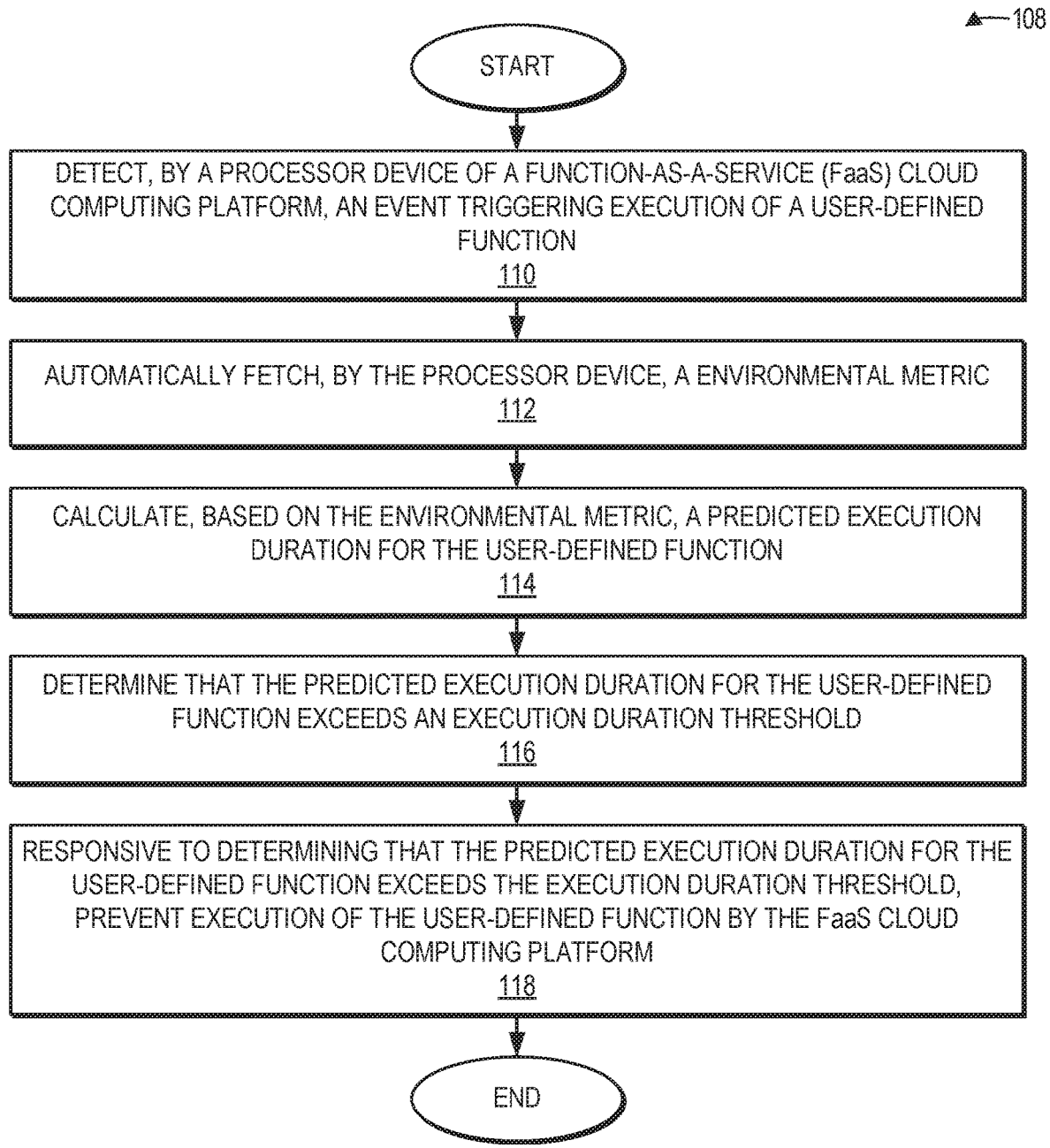
FIG. 5 is a flowchart of a simplified method for predicting execution duration for user-defined functions on the FaaS cloud computing platforms of FIG. 4, according to one example.

FIG. 5 provides a flowchart 108 of a simplified method for predicting execution duration for user-defined functions on the FaaS cloud computing platform 88 of FIG. 4, according to one example. Elements of FIG. 4 are referenced in describing FIG. 5 for the sake of clarity. In FIG. 5, the processor device 94 of the FaaS cloud computing platform 88 of FIG. 4 detects the event 96 triggering execution of the user-defined function 98 (block 110). The processor device 94 automatically fetches the environmental metric 100 (block 112).

The processor device 94 next calculates, based on the environmental metric 100, the predicted execution duration 102 for the user-defined function 98 (block 114). The processor device 94 then determines that the predicted execution duration 102 for the user-defined function 98 exceeds the execution duration threshold 104 (block 116). Responsive to determining that the predicted execution duration 102 for the user-defined function 98 exceeds the execution duration threshold, the processor device 94 prevents execution of the user-defined function 98 by the FaaS cloud computing platform 88 (block 118).

Figure 6:
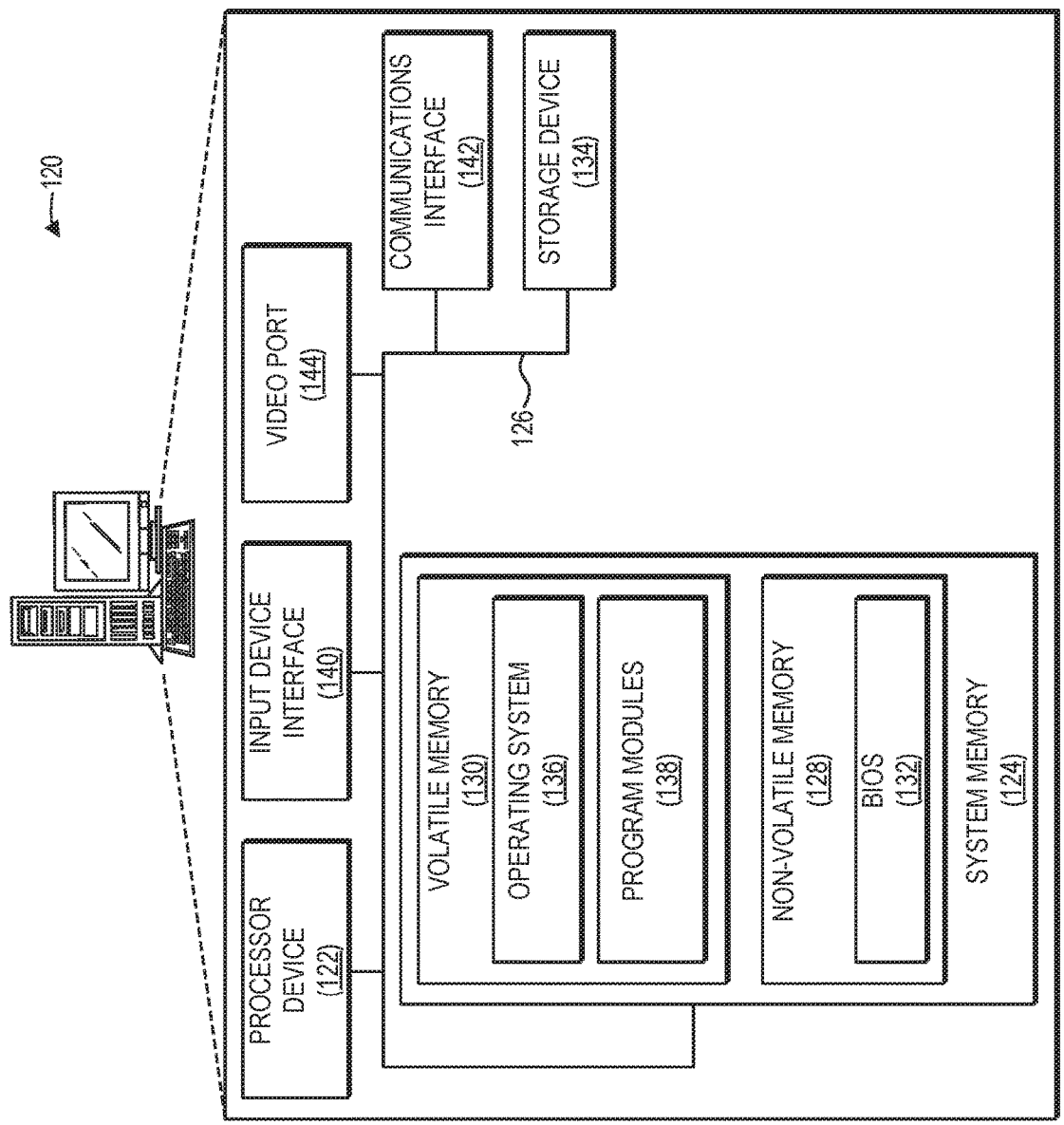
FIG. 6 is a block diagram of a computing device suitable for implementing examples, according to one example.

FIG. 6 is a block diagram of a processor-based computing device 120 ("computing device 120"), such as the computing device 12 of FIG. 1 or the computing device 90 of FIG. 4, suitable for implementing examples described herein. The computing device 120 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 120 includes a processor device 122, a system memory 124, and a system bus 126. The system bus 126 provides an interface for system components including, but not limited to, the system memory 124 and the processor device 122. The processor device 122 can be any commercially available or proprietary processor.

The system bus 126 may be any of several types of bus structures that may further interconnect to a memory bus (with or without a memory controller), a peripheral bus, and/or a local bus using any of a variety of commercially available bus architectures. The system memory 124 may include non-volatile memory 128 (e.g., read-only memory (ROM), erasable programmable ROM (EPROM), electrically EPROM (EEPROM), etc.), and volatile memory 130 (e.g., RAM). A basic input/output system (BIOS) 132 may be stored in the non-volatile memory 128 and can include the basic routines that help to transfer information among elements within the computing device 120. The volatile memory 130 may also include a high-speed RAM, such as static RAM, for caching data.

The computing device 120 may further include or be coupled to a non-transitory computer-readable storage medium such as a storage device 134, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 134 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 134 and in the volatile memory 130, including an operating system 136 and one or more program modules 138 which may implement the functionality described herein in whole or in part. It is to be appreciated that the examples can be implemented with various commercially available operating systems 136 or combinations of operating systems 136. All or a portion of the examples may be implemented as a computer program product stored on a transitory or non-transitory computer-usable or computer-readable storage medium, such as the storage device 134, which includes complex programming instructions, such as complex computer-readable program code, to cause the processor device 122 to carry out the steps described herein. Thus, the computer-readable program code can comprise software instructions for implementing the functionality of the examples described herein when executed on the processor device 122. The processor device 122 may serve as a controller, or control system, for the computing device 120 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 122 through an input device interface 140 that is coupled to the system bus 126 but can be connected by other interfaces, such as a parallel port, an Institute of Electrical and Electronic Engineers (IEEE) 13122 serial port, a Universal Serial Bus (USB) port, an IR interface, and the like.

The computing device 120 may also include a communications interface 142 suitable for communicating with a network as appropriate or desired. The computing device 120 may also include a video port 144 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
    detecting, by a processor device of a function-as-a-service (FaaS) cloud computing platform, a first event triggering execution of a user-defined function;
    automatically fetching, by the processor device, a first environmental metric;
    calculating, based on the first environmental metric, a first predicted execution duration for the user-defined function;
    determining that the first predicted execution duration for the user-defined function exceeds an execution duration threshold; and
    responsive to determining that the first predicted execution duration for the user-defined function exceeds the execution duration threshold, preventing execution of the user-defined function by the FaaS cloud computing platform.

2. The method of claim 1, further comprising:
    detecting, by the processor device, a second event triggering execution of the user-defined function;
    automatically fetching, by the processor device, a second environmental metric;
    calculating, based on the second environmental metric, a second predicted execution duration for the user-defined function;
    determining that the second predicted execution duration for the user-defined function does not exceed the execution duration threshold; and
    responsive to determining that the second predicted execution duration for the user-defined function does not exceed the execution duration threshold, initiating execution of the user-defined function by the FaaS cloud computing platform.

3. The method of claim 1, further comprising receiving, by the processor device, a service access attribute corresponding to a monitoring service providing the first environmental metric.

4. The method of claim 3, wherein the monitoring service comprises an application programming interface (API) provided by the FaaS cloud computing platform.

5. The method of claim 3, wherein the service access attribute comprises one of a Uniform Resource Locator (URL), authentication information, and an access parameter.

6. The method of claim 5, wherein the access parameter comprises a metric identifier corresponding to the first environmental metric.

7. The method of claim 1, further comprising:
    receiving, by the processor device, an execution duration calculation algorithm;
    wherein calculating the first predicted execution duration for the user-defined function comprises executing the execution duration calculation algorithm using the first environmental metric.

8. The method of claim 1, wherein the first environmental metric comprises one of a currently available network bandwidth, a current network latency, a current availability of a data source for the user-defined function, a current processor load level for the FaaS cloud computing platform, and a currently available memory level for the FaaS cloud computing platform.

9. The method of claim 1, wherein the execution duration threshold comprises a timeout interval specified by the FaaS cloud computing platform.

10. The method of claim 1, wherein the FaaS cloud computing platform comprises one of Amazon Web Services (AWS) Lambda, Google Cloud Functions, IBM Cloud Functions, and Microsoft Azure.

11. A computing device of a function-as-a-service (FaaS) cloud computing platform, comprising a memory and a processor device coupled to the memory, the processor device to:
    detect a first event triggering execution of a user-defined function;
    automatically fetch a first environmental metric;
    calculate, based on the first environmental metric, a first predicted execution duration for the user-defined function using an execution duration calculation algorithm, wherein the execution duration calculation algorithm is configured to calculate a first predicted execution duration for the user-defined function in a current operating environment;

determine that the first predicted execution duration for the user-defined function exceeds an execution duration threshold; and responsive to determining that the first predicted execution duration for the user-defined function exceeds the execution duration threshold, prevent execution of the user-defined function by the FaaS cloud computing platform.

12. The computing device of claim 11, wherein the processor device is further to:

detect a second event triggering execution of the user-defined function;

automatically fetch a second environmental metric;

calculate, based on the second environmental metric, a second predicted execution duration for the user-defined function;

determine that the second predicted execution duration for the user-defined function does not exceed the execution duration threshold; and responsive to determining that the second predicted execution duration for the user-defined function does not exceed the execution duration threshold, initiate execution of the user-defined function by the FaaS cloud computing platform.

13. The computing device of claim 11, wherein the processor device is further to receive a service access attribute corresponding to a monitoring service providing the first environmental metric.

14. The computing device of claim 13, wherein the monitoring service comprises an application programming interface (API) provided by the FaaS cloud computing platform.

15. The computing device of claim 13, wherein the service access attribute comprises one of a Uniform Resource Locator (URL), authentication information, and an access parameter.

16. The computing device of claim 15, wherein the access parameter comprises a metric identifier corresponding to the first environmental metric.

17. The computing device of claim 11, wherein the processor device is further to:

receive, by the processor device, the execution duration calculation algorithm;

wherein to calculate the first predicted execution duration for the user-defined function the processor device is to execute the execution duration calculation algorithm using the first environmental metric.

18. The computing device of claim 11, wherein the first environmental metric comprises one of a currently available network bandwidth, a current network latency, a current availability of a data source for the user-defined function, a current processor load level for the FaaS cloud computing platform, and a currently available memory level for the FaaS cloud computing platform.

19. The computing device of claim 11, wherein the execution duration threshold comprises a timeout interval specified by the FaaS cloud computing platform.

20. A computer program product stored on a non-transitory computer-readable storage medium and including computer-executable instructions to cause a processor device of a function-as-a-service (FaaS) cloud computing platform to:

detect an event triggering execution of a user-defined function;

automatically fetch an environmental metric;

calculate, based on the environmental metric, a predicted execution duration for the user-defined function using an execution duration calculation algorithm, wherein the execution duration calculation algorithm is configured to calculate a first predicted execution duration for the user-defined function in the current operating environment;

determine that the first predicted execution duration for the user-defined function exceeds an execution duration threshold; and responsive to determining that the first predicted execution duration for the user-defined function exceeds the execution duration threshold, prevent execution of the user-defined function by the FaaS cloud computing platform.

* * * * *